Figure 1:
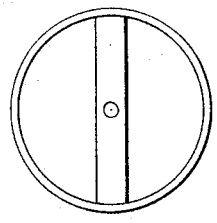

Nov. 12, 1929.   R. STRAUMANN   1,735,805

PROCESS OF PRODUCING WATCH PARTS

Filed Sept. 20, 1928

Inventor:
R. Straumann,
By
Langner Parry Card Sharpus
Attys.

Patented Nov. 12, 1929

1,735,805

UNITED STATES PATENT OFFICE

REINHARD STRAUMANN, OF WALDENBURG, SWITZERLAND, ASSIGNOR TO THE FIRM THOMMENS UHRENFABRIKEN A. G., OF WALDENBURG, SWITZERLAND

PROCESS OF PRODUCING WATCH PARTS

Application filed September 20, 1928, Serial No. 307,285, and in Germany April 20, 1928.

The invention relates to a process for making a compensating balance wheel for watches, clocks, counters and the like, for use in conjunction with a so-called Elinvar spiral balance spring.

As is well known, the commercially obtainable Elinvar balance spring has the property that its thermo-elastic co-efficient remains approximately constant within the temperature limits of −50° to +100° C. It is therefore possible to couple therewith a balance wheel which is made of a single metal, in the form of an uncut and undeformable ring.

The known bi-metallic compensating balance wheel, the rim of which is cut through and consists of strips of steel and brass welded together, as is known deforms with changes in temperature and thus compensates for the influence of the temperature on the elasticity of the spiral steel balance spring. The Elinvar spring, of which the elasticity does not change under temperature influences, does not require such compensating balance wheel, but permits, as above mentioned, the use of a mono-metallic uncut balance wheel.

It has been found, however, that in practice the material used for making the Elinvar springs is not entirely homogeneous. The spiral springs made therefrom will consequently not be constant in their compensating properties. Small compensation errors remain to be corrected. These corrections have hitherto been made possible in known manner by means of bi-metallic compensating strips welded to the mono-metallic balance wheel. This method does indeed permit the use of uncut, stable mono-metallic balance wheels, but the attachment of the said compensating strips involves a considerable increase in cost.

In the drawings:—

Figure 2:
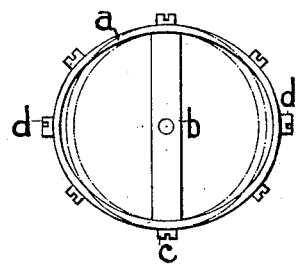

Fig. 1 is a plan view of an undistorted balance wheel of the ordinary type; while Fig. 2 is a plan view of the balance wheel having compensating studs or screws thereon and illustrated in its distorted position, its normal position being shown in broken lines.

Recent metallurgical research has shown that in cold stretching of metals the elementary crystals (crystallites) which make up the metal mass, orient themselves along certain definite directions. This orientation of the crystals can be shown by the so-called fibre or texture diagrams obtained in known manner by the aid of Röntgen rays. A metal with oriented crystals has the property impressed upon it, in a greater or lesser degree, according to its composition and the kind of its crystalline structure, of expanding differently in different directions under the influence of heat.

This property is advantageously made use of in the present invention. The invention consists in using for making the balance wheel a metal so oriented in its crystalline structure by stretching, preferably cold stretching, that the balance wheel made therefrom when affected by temperature changes deforms unequally along two crossing axes, and in utilizing these unequal deformations together with the adjustment of compensating masses to correct the compensation errors.

If therefore a balance wheel is used which has been cut out of a metal band of which the deforming properties in different directions have been made different by cold stretching, then with rising or falling temperature it will change its form, the conditions being diagrammatically shown exaggerated in the accompanying drawing, say from the circular ring form of Figure 1, to the elliptical ring form of Figure 2. This deformation under temperature changes may result simply and solely through the orientation of the metal crytsals produced by cold stretching.

If now a compensating mass, for example a screw, is set in the ring $a$ at $c$, the deformation of the balance wheel will not noticeably change its moment of inertia (the change of form is very small). If, however, such compensating masses or screws are set in the ring $a$ at $d$, where the deformation of the ring shows itself most, then the form changes of the balance wheel due to the method of making it will considerably change the moment of inertia of same and thereby produce a change in the oscillating periods. Changing the position of these masses along the rim of the balance wheel affords the possibility of making use of this deformation of the balance wheel, in conjunction with the known compensating masses of the balance wheel, for correcting compensation errors. Experiments have shown that in an ordinary watch correction of up to three seconds in 24 hours for a temperature difference of 10° are possible on a balance wheel manufactured according to the described process. This effect is sufficient to correct the compensation errors arising in practice. This new balance wheel has the great advantage over the old bimetallic cut balance wheel, of greater stability thereby ensuring the constancy of the oscillating periods of the oscillating control system.

A further possibility of compensation lies in cutting the balance wheel out of a cold stretched metal plate serving for making the balance wheel in such relation to the orientation of the crystals that its carrier arm $b$ is perpendicular or parallel to the main direction of orientation of the crystals.

The stretching above referred to may be performed in a rolling mill or the like.

What I claim is:—

1. The process of producing a compensating balance wheel for watches, clocks, counters and the like, comprising the steps of orienting the crystalline structure of the metal from which the wheel is formed, to such an extent that the balance wheel made therefrom deforms unequally along two crossing axes upon occurrence of temperature changes, forming a balance wheel from the treated metal, and utilizing the unequal deformations in the finished wheel due to temperature changes together with the adjustment of compensating masses to correct compensation errors.

2. The process for producing a compensating balance wheel for watches, clocks, counters and the like, comprising the steps of orienting the crystalline structure of the metal from which the balance wheel is formed in such manner that the balance wheel produced therefrom deforms unequally along two crossing axes upon the occurrence of temperature force, forming a balance wheel from the treated metal, and utilizing the unequal deformation of the finished wheel together with the adjustment of compensating masses to correct compensation errors.

3. The process of producing a compensating balance wheel for watches, clocks, counters and the like, comprising the steps of orienting the crystalline structure of the metal plate from which the balance wheels are produced to such an extent that the balance wheels produced therefrom will deform unequally along two crossing axes upon the occurrence of temperature changes, and forming balance wheels from said metal plate in such manner that the carrier arm thereof is arranged at its selected angle with respect to the direction of orientation of the crystals.

In witness whereof I have hereunto signed my name this 27th day of August, 1928.

REINHARD STRAUMANN.